F. Landon,
Mower.

No 67,
1172.

Reissued April 16. 1861

Witnesses
S. W. Tyler

Frederick Landon
By O. S. & Peck
his Attorney

UNITED STATES PATENT OFFICE.

BYRON E. HUNTLEY, JOHN M. BOWMAN, CHARLES SILLIMAN, AND LA FAYETTE SILLIMAN, OF BROCKPORT, NEW YORK, ASSIGNEES OF FREDERICK LANDON.

IMPROVEMENT IN HARVESTERS.

Specification forming part of Letters Patent No. 30,655, dated November 13, 1860; Reissue No. 1,172, dated April 16, 1861.

DIVISION B.

*To all whom it may concern:*

Be it known that we, BYRON E. HUNTLEY, JOHN M. BOWMAN, CHARLES SILLIMAN, and LA FAYETTE SILLIMAN, of Brockport, in Monroe county, and State of New York, assignees of the invention of FREDERICK LANDON, of said Brockport, of certain new and useful Improvements in Harvesting-Machines, on which Patent No. 30,655, of the date of 13th day of November, 1860, was issued to us as his assignees, do declare that the following is a true, full, and exact description of the same, reference being had to the accompanying drawings, which constitute a part of this specification.

Figure 1:
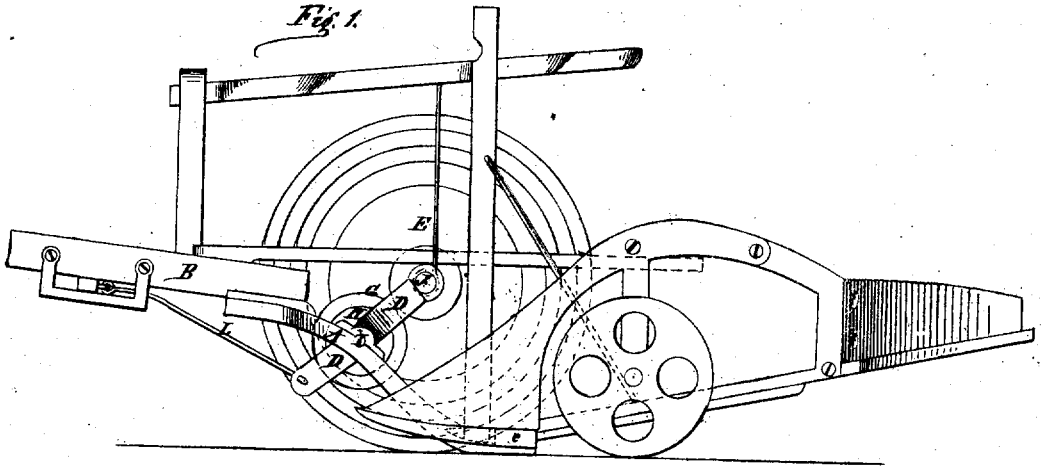
Figure 2:
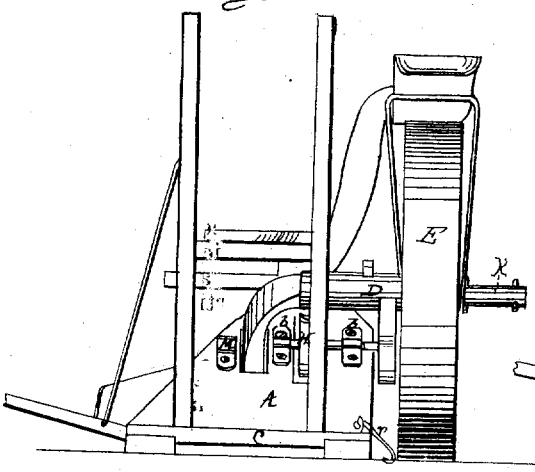
Figure 3:
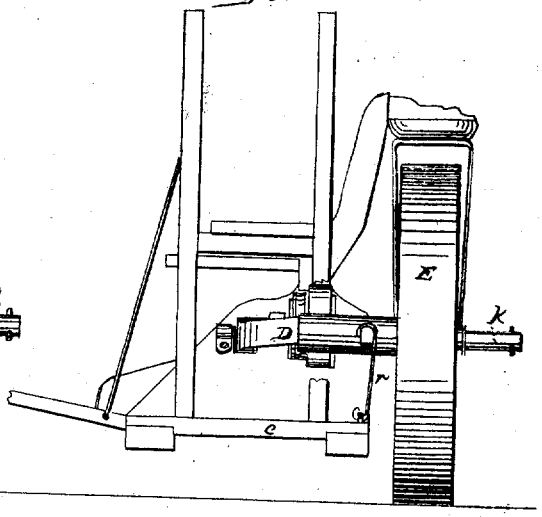

Figure 1 represents a side view or elevation of a machine containing said improvements. Fig. 2 represents a rear view of a machine containing them as arranged for harvesting grass. Fig. 3 represents a rear view of a machine containing them as arranged for harvesting grain.

Besides the use of means to secure a traction action of the drive wheel or wheels of harvesting machines which are described in ananother division of this patent of even date herewith, other devices by which to secure an automatic adjustment of the cutting apparatus of such machines to undulations in its path, whereby to secure a close cut of grass when it is used as a mower, and to secure an adjustment of the cutting apparatus at a suitable height for harvesting grain consistently with the action of a traction-lever are important for a successfully-working machine.

The invention claimed in this patent consists in the use of means by which to secure an automatic adjustment of the cutting apparatus to undulations of the ground in its path when used for harvesting hay, and in a suitable adjustment thereof for harvesting grain, in combination with the traction-lever.

That others skilled in the art may make and use this invention, we proceed to state the manner of its construction and the principle of its operation.

The letter A in the drawings represents the frame of the machine, which may properly be made of iron.

B represents the tongue of the machine, fastened to the top of the front end of the frame.

E represents the drive-wheel of the machine, which is to be constructed with an internal spur-wheel to turn a pinion on a tranverse pinion-shaft, (not shown in the drawings,) that carries a bevel wheel to turn a bevel pinion on a pitman-shaft, which, through its connections, vibrates the cutters. This bevel-wheel is marked G, and a pulley-wheel on said shaft is marked H, Fig. 1. The transverse shaft revolves in boxes *b b* on the frame A.

D represents a traction yoke or lever, and it passes down through the frame near its grain side and outside of the frame next the drive-wheel, and extends below the frame for near half its length. It is connected with the axle of the drive-wheel, the axle of which extends through its upper rearward end, and is seen at J, Fig. 1, and is represented at K, Figs. 2 and 3, and it is pivoted on the transverse pinion-shaft and on the gudgeon I on the frame A. The draft of the machine is from the lower ends of the traction-lever through the iron rods L, which are of suitable strength, and are brought together and carried up under the tongue B, where they are turned over in the form of a hook to receive and hold the whiffletrees, all of which are kept in place by the metallic brackets on the tongue, as seen in Fig. 1. The pinion-shaft and the gudgeon serve as fulcra of the traction-lever, on which it will rock backward and forward agreeably to undulations in the ground in the path of the drive-wheel, or of the frame and cutting apparatus, which shows that the drive-wheel and the frame and cutting apparatus have capacities for vertical motion irrespective of each other, and that as one or the other of them changes its relative vertical position, so does the traction-lever simultaneously change the degree of its inclination to the frame A; and it will appear to be obvious that in its changes the position of the axle of the drive-wheel will be concentrical to the position of the fulcra of the traction-lever. The traction-lever should be made of iron.

The frame A of the machine is of a curved surface, as indicated in Fig. 1, and the finger-bar *c* is secured on or to its rear end. The frame is constructed of iron, and with a preponderance of its weight is in rear of the axis of the traction-lever. It therefore results that combining the frame and cutting apparatus with the traction-lever, as set forth in this patent, secures an automatic adjustment of such cutting apparatus to undulations of the earth in its path, when used in harvesting grasses, irrespective of any vertical movements of the drive-wheel. The finger-bar *c* is made fast on the rear end of the frame A, and the cutting apparatus may be of any approved form. The traction-lever has on its rear transverse end a projection like that shown in Figs. 2 and 3 at *p*, scalloped out near its inner end to receive and hold a hook or link of a chain, *r*, which at its other end is fastened to the frame A, near the corner thereof next the drive-wheel. The object of these devices is to adjust the cutter-bar to a suitable height for harvesting grain consistently with the traction effect upon the drive-wheel of the traction-lever.

When the machine is used in harvesting hay, the traction-lever may work backward and forward on its fulcra to the whole length of the line of the movement of its rearward end; but when the rear end of the frame with the cutting apparatus are brought up and held at a suitable height for harvesting grain it will be perceived that the traction effect of the traction lever will still remain, but that the length of the line of its movement will be shortened according to the degree of the elevation of the cutting apparatus.

It is believed that besides the direct advantages of the use of the devices herein described in securing their mechanical effects a large public advantage will also flow from their use, in enabling parties to build machines of lighter weight and draft, and in the capacity they will possess on the new theater of hilly ground, to which also they will be adapted.

Having thus stated our invention under this division, what we claim therein as new, and desire to secure by Letters Patent, is—

1. The combination of the frame A with the traction-lever D and the axle J, to secure an automatic adjustment of the cutting apparatus to undulations of the earth in its path consistently with the effect of the traction-lever D, substantially as described.

2. The combination of the chain *r* and the projection *p* with the frame A, the lever D, and the axle J, to secure a suitable adjustment of the cutting apparatus for harvesting grain consistently with the effect of the lever D, substantially as described.

BYRON E. HUNTLEY.
JOHN M. BOWMAN.
CHARLES SILLIMAN.
LA FAYETTE SILLIMAN.

Witnesses:
WM. MARTIN,
DANL. HOLMES.